(12) United States Patent
Nakada

(10) Patent No.: US 6,754,813 B1
(45) Date of Patent: Jun. 22, 2004

(54) APPARATUS AND METHOD OF PROCESSING INFORMATION FOR SUPPRESSION OF BRANCH PREDICTION

(75) Inventor: Tatsumi Nakada, Campbell, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/531,608

(22) Filed: Mar. 21, 2000

(30) Foreign Application Priority Data

Aug. 24, 1999 (JP) .......................................... 11-236553

(51) Int. Cl.$^7$ .............................................. G06F 9/00
(52) U.S. Cl. ..................................... 712/239; 712/240
(58) Field of Search ................................ 712/239, 241, 712/240

(56) References Cited

U.S. PATENT DOCUMENTS

| | | | | |
|---|---|---|---|---|
| 4,984,209 A | * | 1/1991 | Rajaram et al. | 365/222 |
| 5,333,283 A | * | 7/1994 | Emma et al. | 712/236 |
| 5,559,611 A | * | 9/1996 | Bloomfield et al. | 358/407 |
| 6,076,155 A | * | 6/2000 | Blomgren et al. | 712/225 |
| 6,125,444 A | * | 9/2000 | Check et al. | 712/245 |
| 6,282,663 B1 | * | 8/2001 | Khazam | 713/320 |
| 6,427,206 B1 | * | 7/2002 | Yeh et al. | 712/239 |

FOREIGN PATENT DOCUMENTS

| | | |
|---|---|---|
| JP | 61-175733 | 8/1986 |
| JP | 63-141132 | 6/1988 |
| JP | 63-303432 | 12/1988 |
| JP | 1-271842 | 10/1989 |
| JP | 4-101219 | 4/1992 |
| JP | 6-324865 | 11/1994 |
| JP | 7-73104 | 3/1995 |
| JP | 10-510076 | 9/1998 |
| JP | 10-333906 | 12/1998 |
| JP | 11-15659 | 1/1999 |
| JP | 11-85515 | 3/1999 |

* cited by examiner

*Primary Examiner*—Eddie Chan
*Assistant Examiner*—Charles Harkness
(74) *Attorney, Agent, or Firm*—Staas & Halsey LLP

(57) ABSTRACT

When a branch instruction for awaiting an event is detected in an information processing apparatus which performs a pipeline process including a branch prediction, a branch prediction for the branch instruction is suppressed. As a result, a prefetch operation for an instruction subsequent to the branch instruction is promoted, and the subsequent instruction is immediately executed when the event to be awaited occurs.

11 Claims, 20 Drawing Sheets

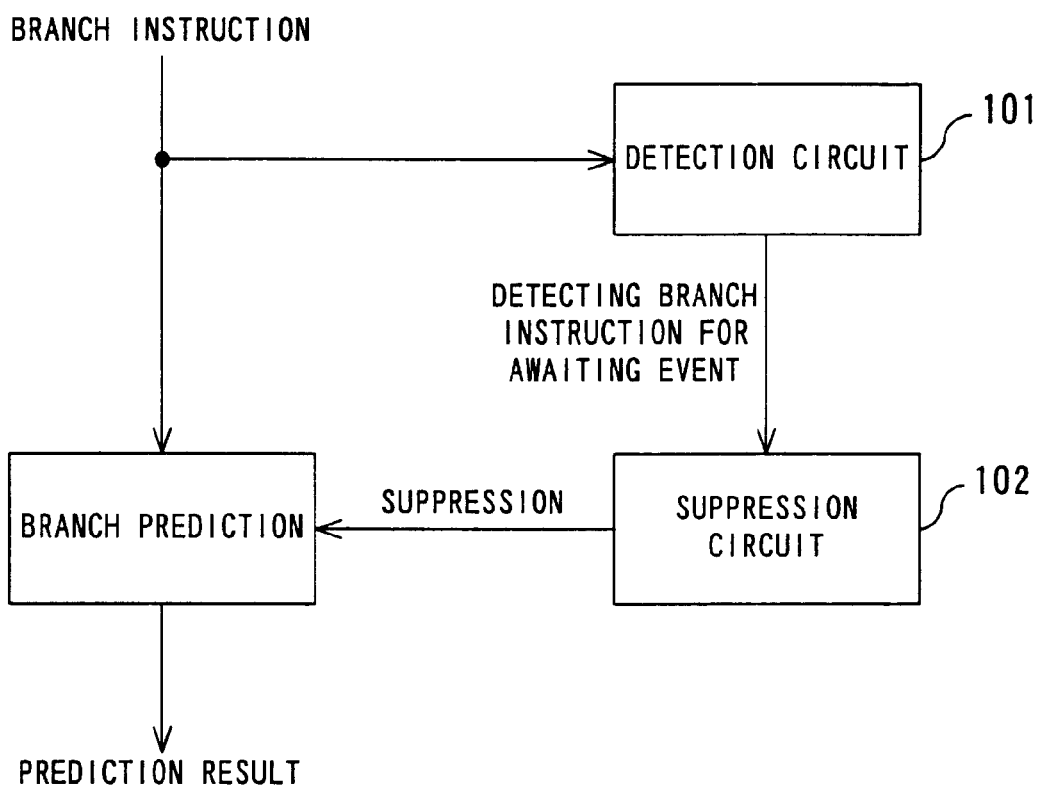
F I G. 2 A

11 : ST (Strongly Taken)

01 : LT (Likely Taken)

00 : LNT (Likely Not Taken)

10 : SNT (Strongly Not Taken)

FIG. 4

| TAKENED | FAULT | HINT | TAKEN | MISS | REFETCH ADDRESS |
|---------|-------|------|-------|------|-----------------|
| 0 | 0 | 0 | 0 | 0 | |
| 0 | 0 | 0 | 1 | 1 | E_TA |
| 0 | 0 | 1 | 0 | 1 | E_PC+4 |
| 0 | 0 | 1 | 1 | 0 | |
| 0 | 1 | — | — | — | IMPOSSIBLE |
| 1 | 0 | — | 0 | 1 | E_PC+4 |
| 1 | 0 | — | 1 | 0 | |
| 1 | 1 | 0 | 0 | 0 | |
| 1 | 1 | 0 | 1 | 1 | E_TA |
| 1 | 1 | 1 | 0 | 1 | E_PC+4 |
| 1 | 1 | 1 | 1 | 0 | |

F I G.  6

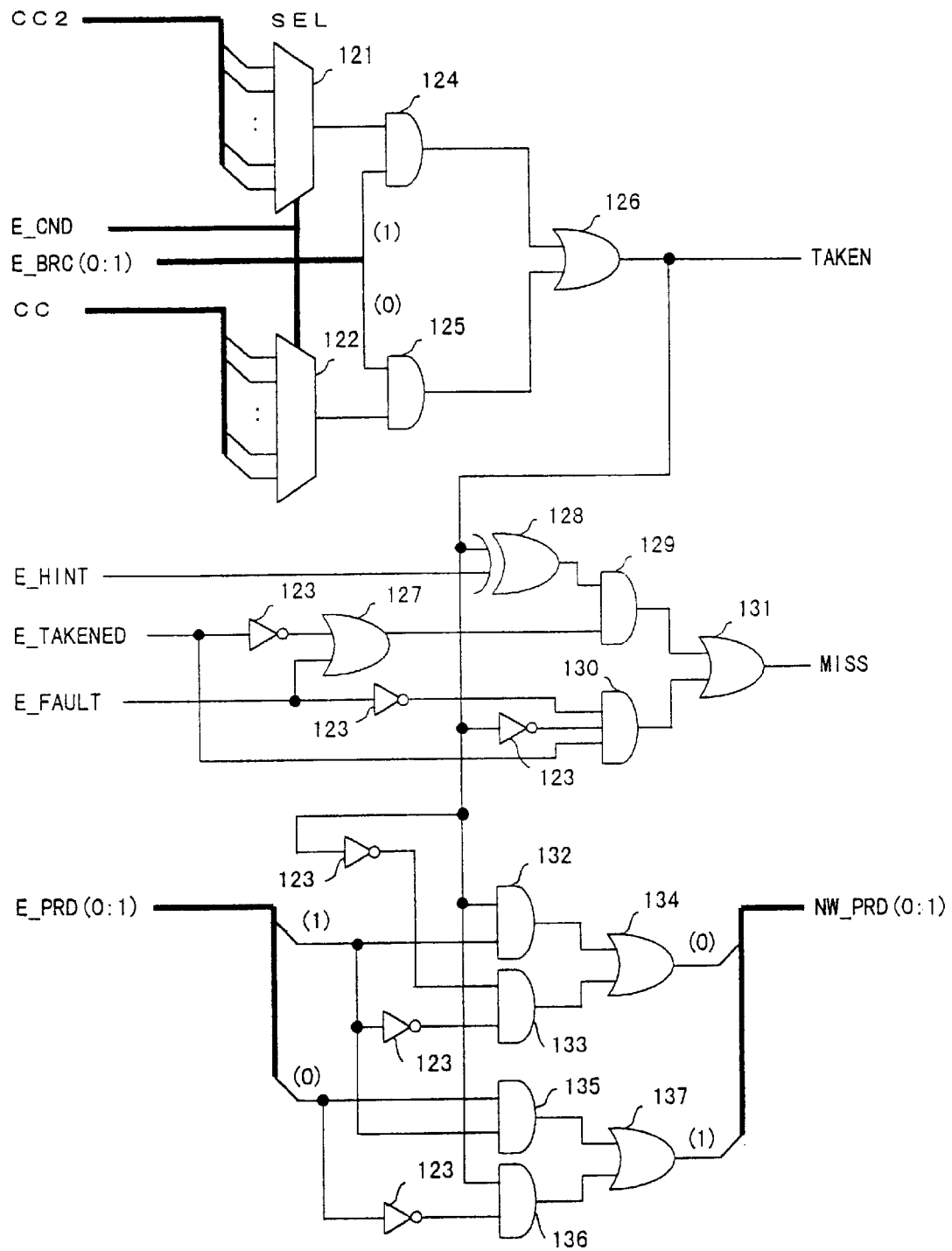
F I G. 9

1st |−P−|−T−|−C−|−R−|−D−|−A−|−E−|−W−|
       BTB                    TKN BTB UPDATE i-th |−P−|−T−|−C−|−R−|−D−|−A−|−E−|−W−|
       BTB                    TKN j-th |−P−|−T−|−C−|−R−|−D−|−A−|−E−|−W−|
       BTB                    N-TKN

|−P−|−T−|−C−|−R−|−D−|−A−|−E−|−W−|

FIG. 11

1st |-P-|-T-|-C-|-R-|-D-|-A-|-E-|-W-|
                          TKN
            |-D-|-A-|         <-- SUBSEQUENT INSTRUCTION IS CANCELED
            |-D-|
            ################################
                    ↓ BRANCH TARGET IS FETCHED AFTER CONFIRMING TKN
            j-th |-P-|-T-|-C-|-R-|-D-|-A-|-E-|-W-|
                                          N-TKN
                                |-D-|-A-|-E-|-W-|
                                    |-D-|-A-|-E-|-W-|
                                    ↑ SUBSEQUENT INSTRUCTION IS EXECUTED AS IS

F I G. 12

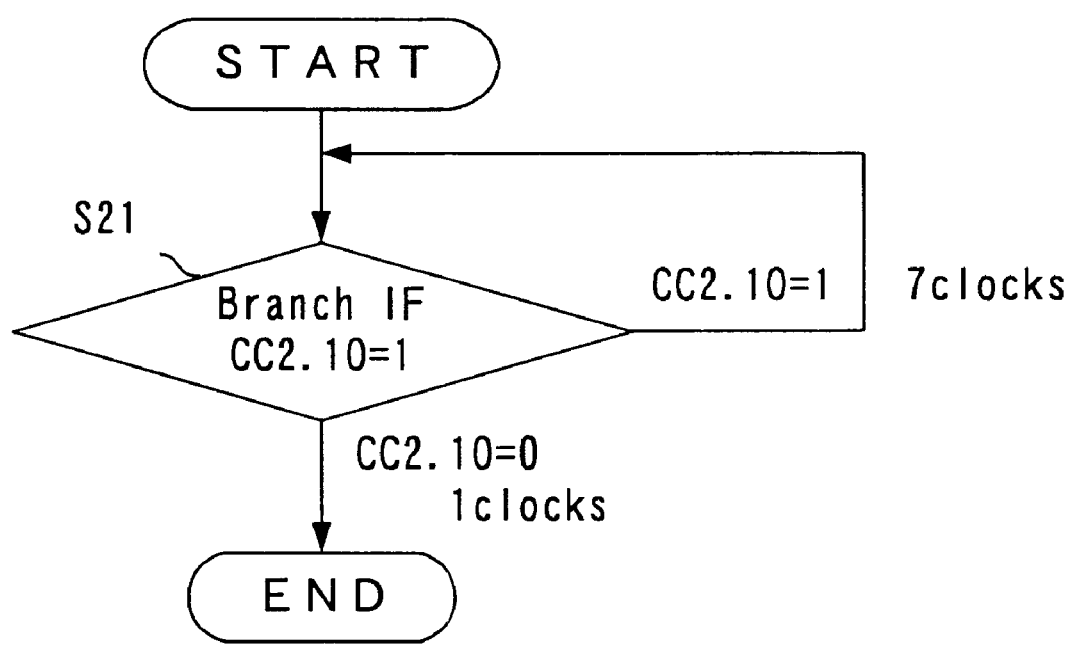
F I G. 1 5

APPARATUS AND METHOD OF PROCESSING INFORMATION FOR SUPPRESSION OF BRANCH PREDICTION

BACKGROUND OF THE INVENTION

1. Field of the Invention

The present invention relates to an information processing apparatus and method for performing a pipeline process using a branch prediction mechanism.

2. Description of the Related Art

A recent computer has a branch prediction mechanism using a table to quickly perform an instruction process, especially a branch process. The branch prediction mechanism contains in the branch target table the prediction information about whether or not there is a branch instruction, and, if there is a branch instruction, about whether or not the branch is to be taken, and the information about a branch target instruction address, and searches the table using an instruction fetch address when an instruction is fetched. If there is a branch instruction and the information that the branch is taken is entered, then a branch target instruction fetch is invoked using a corresponding branch target instruction address.

Thus, a branch target instruction fetch can be invoked at an earliest possible timing without fetching and decoding an instruction. As a result, a wait time taken for fetching a branch target instruction can be shortened, and a process can be quickly performed by a computer.

The branch prediction using the above described table is described in detail in various documents and patent applications. For example, the Japanese Patent Laid-Open No.6-324865 ('Multiprediction-type Branch Prediction Mechanism', Japanese Patent Application No.3-252872) discloses the technology of using both branch prediction used in a decoding process and branch prediction used in an instruction fetching process. In this document, various prior art technologies relating to branch prediction are introduced.

A program having a loop structure can be quickly executed in most cases by predicting a branch because it is predicted that a branching operation using a previously branched instruction can occur again, and the branch prediction in a program in which a loop process is executed is correct except an exit from the loop. Especially, the prior art technologies which emphasize quick execution of a loop can be listed below.

Japanese Patent Application Laid-Open No.7-73104 ('Cache System', Japanese Patent Application No.6-117056)

Published Japanese Translation of PCT International publication for Patent Application No.10-510076 ('Limited Run Branch Prediction', Japanese Patent Application No.8-518876)

Japanese Patent Application Laid-Open No.10-333906 ('Branch Prediction Apparatus', Japanese Patent Application No.9-139736)

Japanese Patent Application Laid-Open No.4-101219 ('Instruction Branch Prediction System', Japanese Patent Application No.2-218655)

Japanese Patent Application Laid-Open No.63-141132 ('Instruction Prefetch Apparatus', Japanese Patent Application No.61-289363)

Japanese Patent Application Laid-Open No.1-271842 ('Information Processing Apparatus', Japanese Patent Application No.63-100818)

The above described technologies are generally classified as follows.

(1) To quickly fetch a branch target instruction
(2) To correctly predict the behavior of a loop
(3) To reduce the penalty when a branch prediction fails.

FIG. 1A shows a general configuration of a common pipeline computer. When an instruction fetch address and a fetch request is transmitted from an instruction fetch control unit 11 to an instruction memory access pipeline (instruction fetch pipeline) 12, an instruction code is fetched based on the address, and supplied to an instruction buffer 13. The instructions stored in the instruction buffer 13 are passed to an instruction execution pipeline 14, thereby starting the execution of the instructions.

The instruction execution pipeline 14 executes an operations instruction, makes a branch decision when a branch instruction is detected, and transmits the information about whether or not a branch is taken (branch taken information), a branch target address, etc. to the instruction fetch control unit 11. Under the control by the instruction fetch control unit 11, the instruction fetch continues based on the new instruction fetch address.

FIG. 1B shows the configuration of the circuit of the instruction fetch control unit 11. The circuit shown in FIG. 1B includes incrementers 21 and 22, a branch target table (BTB) 23, a comparison circuit (CMP) 24, an AND circuit 25, selection circuits (selector, SEL) 26 and 27, and a prefetch program counter (PFPC) 28.

When a branch prediction is not made in branch fetch control, a signal D_TA (branch target address of an instruction processed at the decoding stage), the BTB 23, the CMP 24, the AND circuit 25, and the 2-input selector 26 are not required.

In this case, the first fetch address is selected by the selection circuit 27 through a signal PC, and enters the PFPC 28. The address held in the PFPC 28 is an instruction fetch address, and transmitted to the instruction memory access pipeline 12 shown in FIG. 1A. At this time, the incrementer 22 receives an output signal from the PFPC 28, adds 8 to the signal, and outputs a resultant address.

If a signal indicating that a branch is taken (TAKEN described later) is not asserted (if the signal is not a logic '1'), then an output from the incrementer 22 is selected at the next clock, and the address is fetched. Thus, consecutive instructions are fetched. Here, it is assumed that an instruction occupies 4 bytes and two instructions are simultaneously fetched.

FIG. 1C shows the circuit of the instruction execution pipeline 14 shown in FIG. 1A. The circuit shown in FIG. 1C is provided with the BTB 23, registers 31, 33, 34, 35, 36, 38, 39, 41, 42, 43, 44, 45, 46, 47, 48, 49, 51, 53, 54, 55, 56, 57, 58, and 59, a general purpose register (GR) 32, an arithmetic and logic unit 37, a decoder (DEC) 40, a branch decision circuit (BRC_DECISION) 50, and an adder 52.

In FIG. 1C, the characters D, A, E, and W indicating the process stages of instructions respectively correspond to a decode stage (D stage), an address computation stage (A stage), an execution stage (E stage), and a write stage (W stage).

In this example, two instructions are executed in a pipeline operation. The preceding instruction is a comparison instruction (CMP). This instruction reads two values to be compared with each other from the general purpose register 32, performs a comparing operation using the arithmetic and logic unit 37 at the E stage, and writes the resultant condition code (CC) to the register 38.

The subsequent instruction is a branch instruction (BRC). This instruction computes the branch target address at the D stage according to the signal D_PC (a program counter of the instruction processed at the D stage), the branch target address offset portion (OFFS) in the branch instruction, and the constant of 4.

In a decoding operation, a signal D_BRC indicating whether or not an instruction is a branch instruction, and a signal D_CND indicating the condition of branching are generated, managed as pipeline tags, and transferred to the subsequent stage. Since the CC of the result of the preceding comparison instruction is used in a branch decision, a branch decision for the subsequent branch instruction is made at the E stage. In this example, the branch decision is made by the branch decision circuit 50 using the condition of the CC selected by the E_CND.

When a branch is taken, the signal TAKEN from the branch decision circuit 50 is asserted, the signal E_TA (the branch target address of the instruction processed at the E stage) is selected as shown in FIG. 1B, and the address is input to the PFPC 28.

The address E_TA corresponds to the address obtained by adding up the signal D_PC, the offset, and 4 at the D stage of the branch instruction as shown in FIG. 1C, managed as a pipeline tag, and transferred to the E stage. However, in this example, the branch target address of the branch instruction is defined as a sum of the value of the program counter indicating the subsequent instruction and the offset in the branch instruction.

Described below is the operation performed when a branch is predicted using a part of an instruction referred to as a HINT bit. The prediction according to the HINT bit is a technology of quickly performing a process using the feature that branches of some instructions can be correctly predicted with a high probability before actually executing the instructions.

For example, there is a high possibility that a branch is actually taken in a branching operation used to repeat a loop using a DO statement of Fortran or a for statement of the C language while there is a small possibility that a branch is actually taken in a branching operation used in a determination for an exit from the loop. This information is embedded as a HINT bit in a part of the instruction code, and a branch target fetch is invoked in a decoding operation before the condition is discriminated using the CC, etc., thereby quickly performing the process.

Therefore, in FIG. 1B, if the signal D_TA is used, and the signal D_HINT decoded at the D stage shown in FIG. 1C is asserted, then the signal D_TA is selected, thereby updating the PFPC 28. As a result, the branch target instruction can be fetched more quickly by 2 clocks than the switch at the E stage.

However, if it is turned out in the branch decision at the E stage that the branch prediction is not correct, then the E_PC+4 output from the incrementer 21 is selected, and a fetching operation is performed again from the instruction immediately after the branch instruction. Another processing method to be followed when branch prediction is not correct is to prefetch unpredicted instructions and execute the instructions, to preliminarily execute the subsequent instructions in the case where the branch is not taken, etc.

It is determined whether or not a branch has been correctly predicted by comparing the HINT information (E_HINT) transferred up to the E stage by the pipeline tag with the signal TAKEN generated from the CC at the E stage. At this time, it is determined that the branch prediction has failed if E_HINT=1 and TAKEN=0.

Described below is the operation performed when a branch is predicted using the BTB 23. In the above described prediction using the HINT bit, the branch prediction is invoked at an early stage. However, since it is not invoked until an instruction is read to the instruction execution pipeline 14 shown in FIG. 1A, the branch target instruction can be fetched earlier only by 2 clocks. To invoke a branch target instruction fetch at a furthermore early timing, it is necessary to fetch a branch target at the stage of the control by the instruction fetch control unit 11 shown in FIG. 1A.

To attain this, a branch prediction mechanism for obtaining a branch target address from the fetch address is added. The BTB 23 shown in FIG. 1C caches the branch target address as if it were an instruction cache for the main storage. When a branch instruction is executed, the address of the branch instruction and the address of the branch target instruction are entered in the BTB 23.

FIG. 1D shows the circuit of the instruction memory access pipeline 12 containing the BTB 23. The instruction memory access pipeline 12 includes a P (priority) stage, a T (table) stage, a C (check) stage, and an R (result) stage. In addition to the BTB 23 shown in FIG. 1C, it contains registers 60 and 61, an instruction cache (I-cache) 62, a register group 63, and a selection circuit (Way sel) 64.

The BTB 23 is a 2-port RAM (random access memory) including a read port which receives a read address stored in the register 60, and a write port which receives a write address stored in a register 58 shown in FIG. 1C. FIG. 1D shows only the circuit of the read system of the BTB 23.

The instruction buffer 13 includes a register group 65 and a selection circuit 66. A register 67 corresponds to the register 31 or 39 shown in FIG. 1C.

When an instruction is fetched, the instruction cache 62 is searched using the address from the PFPC 28, and similarly the BTB 23 is searched. If the address of the PFPC 28 is entered in the BTB 23, then the address stored in the PFPC 28 is changed into the branch target address of the BTB 23. Thus, when the instruction is fetched, the instruction fetch address is switched into a branch target address.

When an actual branching operation is performed in the instruction execution pipeline 14, the signal E_BRC is asserted, and the BTB 23 is updated. At this time, as shown in FIG. 1C and FIG. 9 shown later, the branch prediction information NW_PRD (Next Write_Prediction) is generated by the branch decision circuit 50 from the signal E_PRD and the signal TAKEN transferred using a pipeline tag. Then, the signal NW_PRD is written together with the signals E_PC and E_TA to the BTB 23. Described above is the outline of the operation of the typical conventional branch prediction.

However, the technology of the above described conventional branch prediction has the following problem.

In the method (2) above, the number of times of a loop is stored in a register, and an exit from the loop is predicted from the number of times and the pattern of the loop. However, there is a loop for which the above described prediction cannot be made. For example, a loop process may be performed to await the completion of an operation of an input/output device (IO), the completion of the barrier synchronization among a plurality of processor elements (PEs), or the completion of main storage access.

FIG. 1E shows an example of a parallel computer which awaits an event. The parallel computer shown in FIG. 1E includes n+1 processor elements PE 0, PE 1, ..., PE n. Each PE includes a central processing unit (CPU) 71, memory (main storage) 72, an input/output device (IO) 73, a vector unit (VU) 74, and a synchronization circuit (PE Sync) 75.

The CPU 71, the memory 72, the IO 73, the vector unit 74, and the synchronization circuit 75 are interconnected through an address bus 76 (A) and a data bus 77 (D). The CPU 71 and the vector unit 74 are connected to each other through a vector command bus 78 (VC) and a vector data bus 79 (VD). In addition, the CPU 71 includes a branch unit (BRU) 81, an access control unit 82, and a vector interface control unit 83.

The IO 73 performs an operation relating to the input and output of data. The CPU 71 awaits the completion of the operation as necessary.

The synchronization circuit 75 is provided for synchronizing the PEs and can be accessed by the CPU 71 as a part of the IO (including a memory mapped IO) or using an exclusive instruction. When each PE completes its assigned job, the CPU 71 writes data indicating the completion of the event to the synchronization circuit 75. The written information is propagated to all PEs through a signal line 84 for connecting the synchronization circuits 75 of the PEs. When a predetermined condition is satisfied, the awaiting synchronization among the PEs can be released.

The vector unit (VU) 74 is provided to quickly perform a computing process, and contains a vector operations unit. The vector operations unit can quickly perform a consecutive operations, etc., but cannot perform all processes. Therefore, a computer referred to as a vector computer is provided not only with the vector unit 74, but also with the CPU 71 having a common configuration. The CPU 71 is referred to as a scalar processor or a scalar unit (SU) to explicitly indicate that it performs no vector processes.

When the result obtained by the vector unit 74 is furthermore processed by the SU 71, and when the data prepared by the SU 71 is received by the vector unit 74 for processing, it is necessary to provide a mechanism for synchronizing the data in the two units. If there is a small volume of data, the vector data bus 79 can be used. However, if a large volume of data is transmitted and received, a synchronizing process is performed through the memory 72.

When the computation result from the vector unit 74 is received by the SU 71, the computation result is written to the memory 72. The SU 71 has to await the completion of the writing, and start executing a memory read instruction. When the computation result from the SU 71 is received by the vector unit 74 through the memory 72, the computation result is written into the memory 72. The VU 74 has to await the completion of the writing, and start executing a memory read instruction. Therefore, in any case, the completion of the writing to the memory 72 is awaited.

Thus, awaiting the completion of an event is an important element when the performance of a computer is to be improved. When an event is awaited in a loop process, the performance in exiting from a loop when the waited event occurs as well as the performance of a branch for repeating the loop is required.

When there is a branch for awaiting an event, the number of times of a loop process is not set in a register, and the number of times of the loop process is not constant every time. Therefore, no predictions can be made or are correct by the conventional technology. Practically, since it is predicted in most predicting methods that a branch is taken if the number of times of branching is large in the recent executions, a branch prediction is not correctly made at the exit from the loop, thereby lowering the speed of the exit from the loop, which is an essential element in awaiting an event.

In addition, relating to the branch condition flag, the conventional computer determines the signs or the comparison result of sizes of two values based on the result of the preceding operations. Therefore, if the conditions of the completion of the operation of the IO 73 external to the CPU 71, the completion of barrier synchronization, etc. are awaited, then external information is referred to by a load instruction (in the case of memory mapped IO) referring to an external signal or an IO instruction to reflect the external state in the condition flag by a logic operation, etc., and a branching operation is performed.

Therefore, although the branching operation can be quickly performed, a loop cannot be executed within a time shorter than a sum of an external information reference time and a logic operation time. Therefore, waiting cannot be released (sampling cannot be made) in a time shorter than the sum of the times, thereby prolonging the waiting time for release of a loop.

That is, in the conventional method, there arise the cost of the sampling time for release of waiting, and the cost of a penalty (additional time required to make a branch prediction) for an erroneous prediction of a branch at an exit from a loop, thereby making it impossible to perform a quick waiting process.

SUMMARY OF THE INVENTION

The present invention aims at providing an apparatus and a method of processing information for improving a prediction of the behavior of an event-awaiting branch loop in a pipeline process containing a branch prediction, thereby speeding up the exit from the loop.

The information processing apparatus according to the present invention includes a detection circuit and a suppression circuit, and performs a pipeline process containing a branch prediction. The detection circuit detects that an instruction is a branch instruction for awaiting an event. The suppression circuit suppresses the branch prediction for the branch instruction when the detection circuit detects the branch instruction for awaiting the event.

BRIEF DESCRIPTION OF THE INVENTION

FIG. 2A shows the principle of the information processing apparatus according to the present invention;

FIG. 4 shows the definition of a prediction bit;

FIG. 6 shows whether or not a branch prediction is correctly made;

FIG. 9 shows the configuration of the branch decision circuit;

FIG. 11 shows the first loop process sequence;

FIG. 12 shows the second loop process sequence;

FIG. 15 is a flowchart of the third loop process.

DESCRIPTION OF THE PREFERRED EMBODIMENTS

Figure 1A:
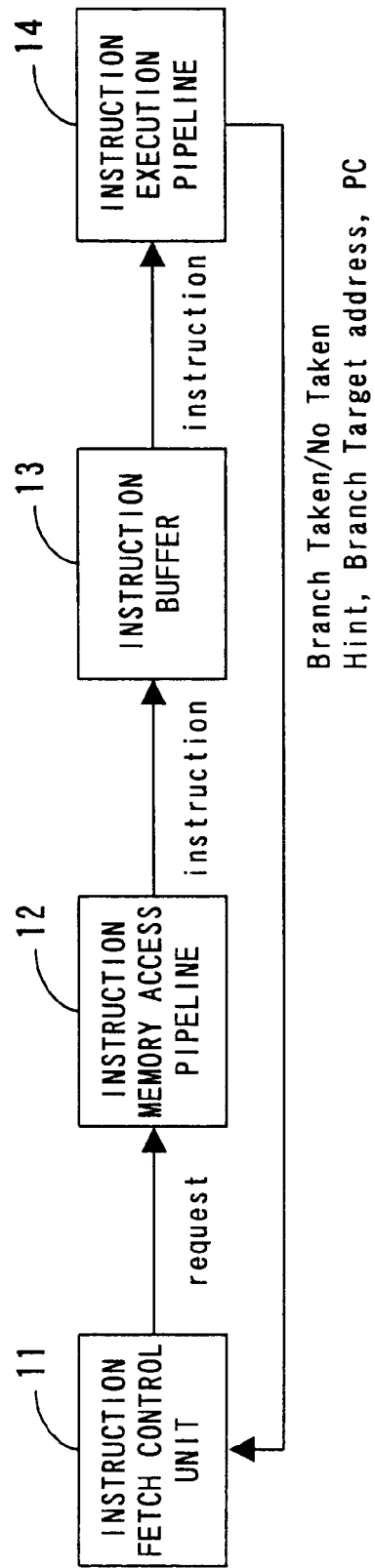
FIG. 1A shows the configuration of a computer.

The embodiments of the present invention are described below by referring to the attached drawings.

FIG. 2A shows the principle of the information processing apparatus of the present invention. The information processing apparatus shown in FIG. 2A comprises a detection circuit 101 and a suppression circuit 102, and performs a pipeline process containing a branch prediction.

The detection circuit 101 detects that an instruction is a branch instruction for awaiting an event. The suppression circuit 102 suppresses the branch prediction for the branch instruction when the detection circuit 101 detects the branch instruction for awaiting the event.

The information processing apparatus normally performs a pipeline process by making a branch prediction using the above described HINT bit, a branch target table, etc. For example, the detection circuit 101 corresponds to a branch instruction recognition circuit, and determines whether or not a given instruction is a branch instruction for awaiting an event. If the instruction is a branch instruction other than that for awaiting an event, a branch prediction for the instruction is made. If the instruction is the branch instruction for awaiting the event, a branch prediction for the instruction is suppressed.

For example, the suppression circuit 102 suppresses updating the branch target table based on the execution result when a branching operation is performed by a branch instruction for awaiting an event. Thus, a branch prediction made when the branch instruction is fetched is suppressed, thereby promoting a prefetch operation for the instruction subsequent to the branch instruction. Otherwise, the suppression circuit 102 suppresses a branch prediction made using a HINT bit when a branch instruction for awaiting an event is decoded.

Thus, the point of the present invention is to suppress a branch prediction of a branch instruction for awaiting an event, thereby promoting a prefetch operation for the instruction subsequent to the branch instruction, and allowing the subsequent instruction to be immediately executed when the event occurs. Therefore, the waiting time at an exit from a branch loop for awaiting an event can be shortened.

Furthermore, when a storage circuit storing condition code information exclusive for awaiting an event is provided, the process of a branch loop for awaiting an event can be furthermore quickly performed. In this case, the above described exclusive condition code information is updated according to the signal from the source of an awaited event. When the suppression circuit 102 detects that a branch instruction for awaiting an event is a conditional branch instruction referring to the exclusive condition code information, it outputs a control signal for reference to the condition code information.

Then, the information processing apparatus does not make a branch decision using an external reference instruction and a logic operation, but makes a branch decision by referring to the exclusive condition code information according to the output control signal, thereby requiring no time to executing an external reference instruction and a logic operation, and quickly making a branch decision.

Figure 2B:
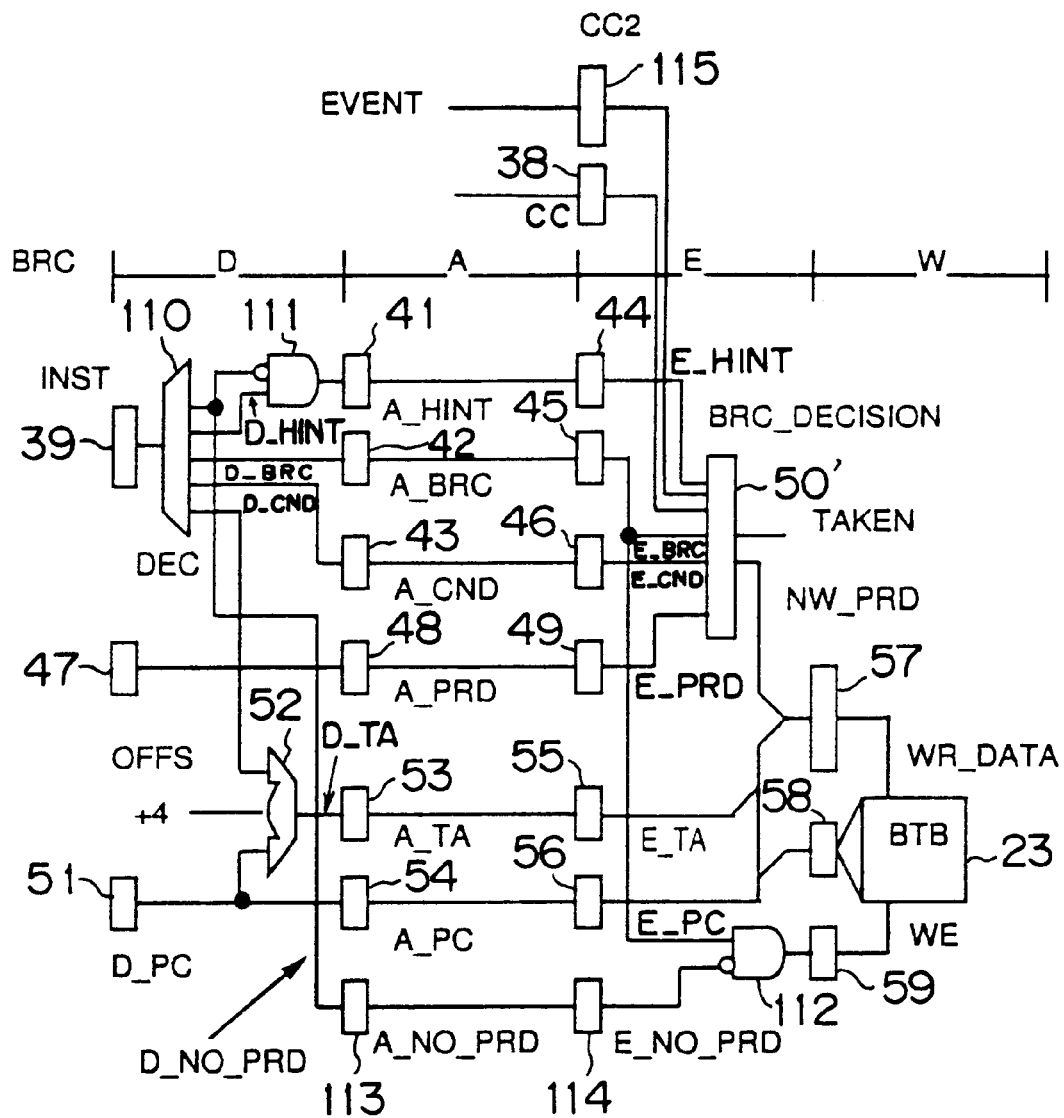
FIG. 2B shows an instruction execution pipeline according to the present invention.

For example, the detection circuit 101 shown in FIG. 2A corresponds to a decoder 110 shown in FIG. 2B. The suppression circuit 102 shown in FIG. 2A corresponds to AND circuits 111 and 112, and registers 113 and 114 shown in FIG. 2B.

According to the present invention, a circuit for detecting that an instruction is a branch instruction for awaiting an event is added to the information processing apparatus such as a computer, etc. When a branch instruction for awaiting an event is detected, the branch target table is not updated, thereby suppressing a quick operation of an undesired loop, and speeding up the exit from the loop.

The waiting time when a prediction using the branch target table is suppressed according to the present invention is evaluated on the following example of a loop process.

Loop: branch flag, Loop next__instruction

Assuming that the penalty when a prediction has been correctly made in a branch prediction is $1\tau$, and the penalty when the prediction has failed is $6\tau$, the time taken to execute a subsequent instruction can be obtained as follows after a condition flag is set both when a branch prediction is made and not made.

When a branch prediction is made, a flag can be sampled once per $2\tau$. Therefore, the sampling error is $(0+1)/2=0.5$ ($\tau$) on an average. When a branch prediction is not made, a flag can be sampled only once per $7\tau$, and the sampling error is $(0+1+2+3+4+5+6)/7=3$ ($\tau$) on an average.

A waiting time for an exit from a loop is obtained by adding the penalty until a subsequent instruction is executed to the above described sampling errors. When a branch prediction is made, it fails when the control exits from a loop. Therefore, the penalty is $6\tau$. Accordingly, the waiting time at an exit from a loop can be calculated as $0.5+6=6.5$ ($\tau$). When a branch prediction is not made, no penalty is imposed, and the waiting time at an exit from a loop can be calculated as $3+0=3$ ($\tau$). Thus, to improve the performance of exiting from a loop, it is better not to make a branch prediction.

In this example, a branch prediction to be made when an instruction is fetched is suppressed. However, when a branch prediction is made when an instruction is decoded, it also is to be suppressed. In addition, in a computer which makes a branch prediction only during the decoding operation, it is apparent that the suppression of a branch prediction is effective. As a method of suppressing a branch prediction during the decoding operation, a signal indicating a branch during the decoding operation, such as a HINT bit contained in an instruction code, is masked so that the operations on the non-branching side are performed.

In addition, according to the present invention, a condition flag is changed not using an external reference instruction or a logic operation, but by newly introducing a condition flag bit exclusive for awaiting an event, thereby specifying the condition flag awaiting an event using an instruction. Thus, no time is taken for an external reference or a logic operation, thereby shortening the time required to sample a branch condition. The performance for a loop awaiting an event can be furthermore improved by speeding up an exit from a loop by using the condition flag together with the function of suppressing the update of the branch target table.

Figure 1B:
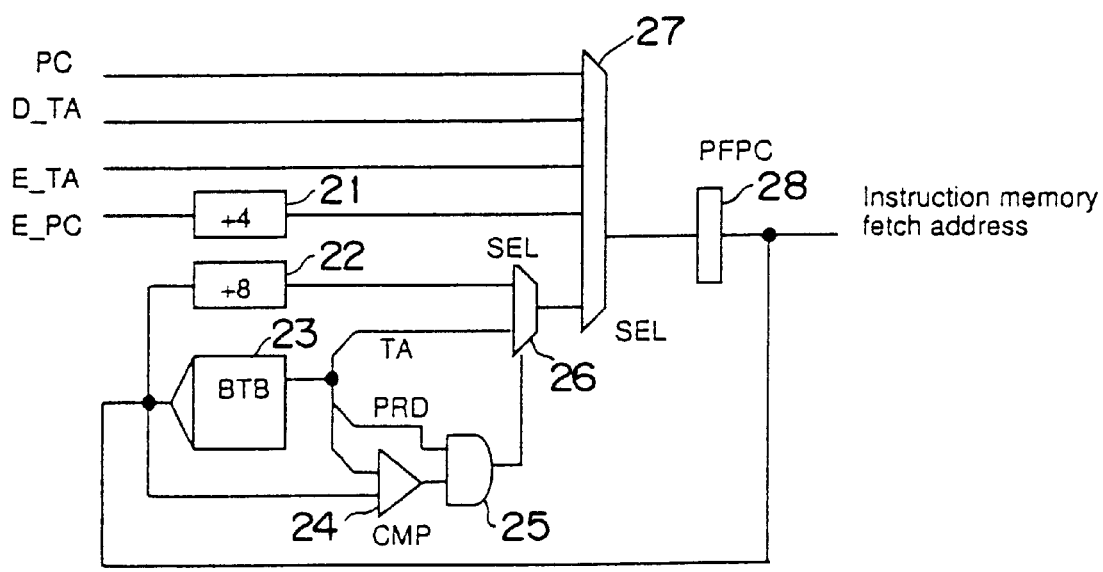
FIG. 1B shows the configuration of an instruction fetch control unit.
Figure 1C:
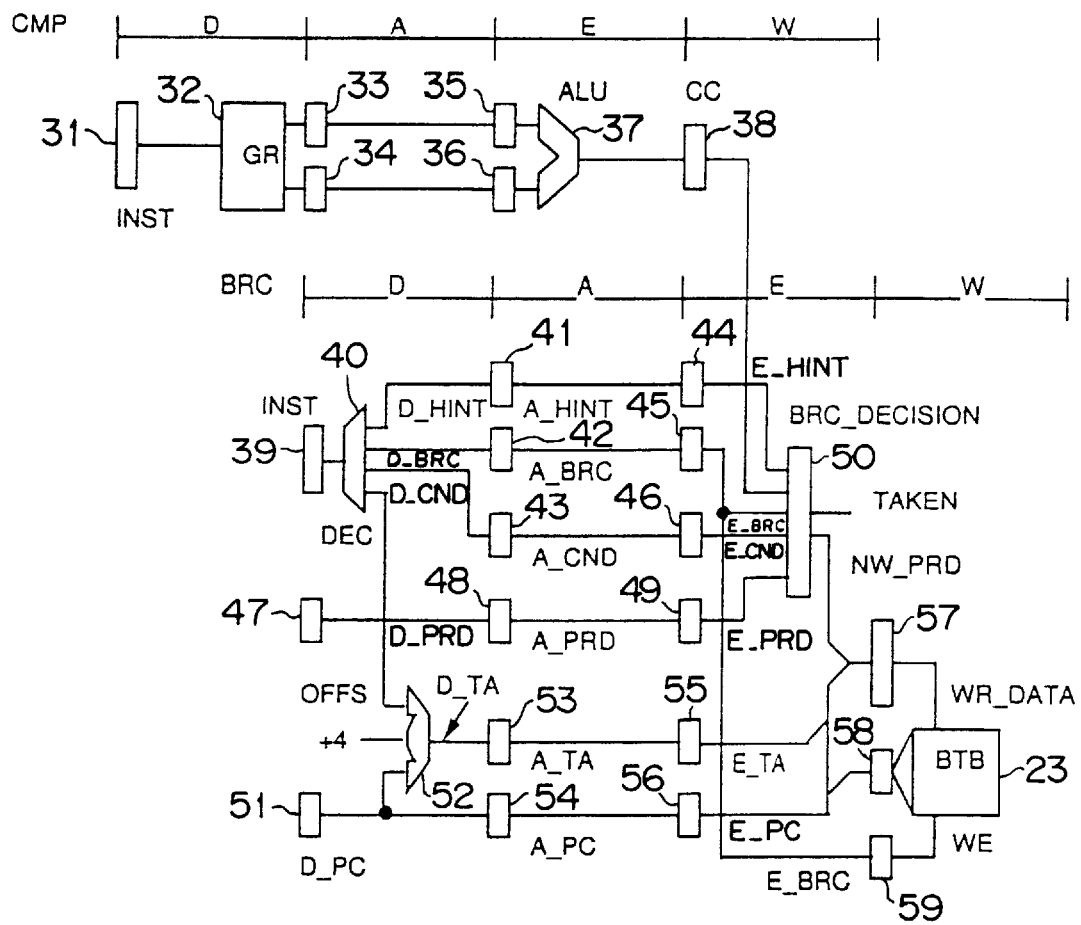
FIG. 1C shows the conventional instruction execution pipeline.

FIG. 2B shows the circuit obtained by adding the above described mechanism to the instruction execution pipeline 14 shown in FIG. 1C. In FIG. 2B, the components also shown in FIG. 1C are assigned the same numerals, and new components such as the decoder 110, the AND circuits 111 and 112, the registers 113, 114, and 115, and a branch decision circuit 50' are added. When the circuit shown in FIG. 2B is compared with the circuit shown in FIG. 1C, they are different from each other in the following points.

(1) The decoder 110 generates a signal D__NO__PRD indicating that a branch prediction is not made.
(2) The registers 113 and 114 store the signal D__NO__PRD as a pipeline tag.
(3) The AND circuit 111 negates a signal D__HINT for controlling a branch prediction in a decoding process when the signal D__NO__PRD is asserted.
(4) The AND circuit 112 suppresses a signal WE for a write to the BTB 23 when a signal E__NO__PRD is asserted.

Figure 3:
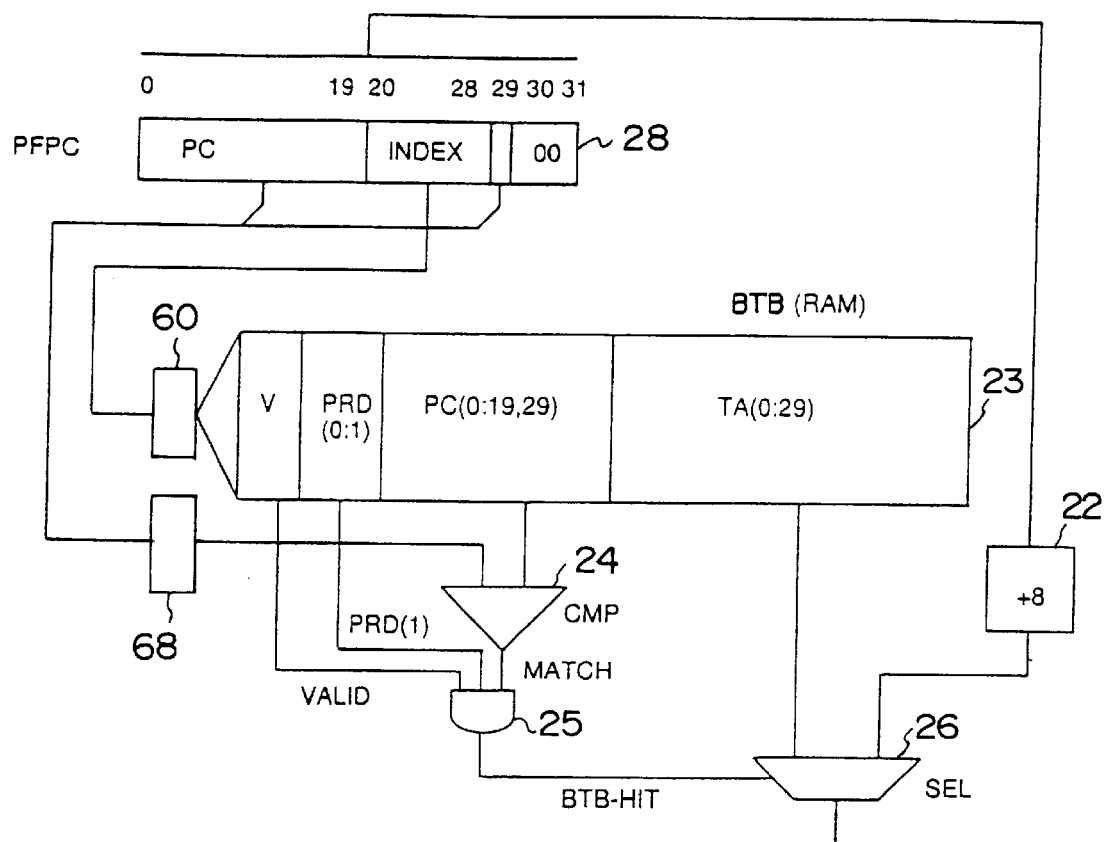
FIG. 3 shows a branch target table.

Before describing the operations of these new circuits, the operation about the branch prediction using the BTB 23 is described below in detail. Each entry of the BTB 23 contains the fields as shown in FIG. 3. Each field contains the following information.

V: information indicating that a BTB entry is valid.
PRD: branch prediction information indicating the possibility that an entered branch instruction takes a branch
PC: a part of an address of an entered branch instruction
TA: an instruction address of a brach target of an entered branch instruction A register 68 holds the field PC of the PFPC 28. The CMP 24 compares the information held in the register 68 with the field PC of the BTB 23. When the information and the field match each other, the signal MATCH is asserted. When the signal VALID indicating the value of the field V, the PRD(l) indicating the LSB (least significant bit) (bit 1) of the signal PRD, and the signal MATCH are asserted, the AND circuit 25 asserts the signal BTB-HIT indicating that the address of the PFPC 28 hits the BTB 23.

Thus, the selection circuit 26 selects the address of the field TA of the BTB 23, and switches the address of the PFPC 28 into a predicted branch target address.

The prediction bits (2 bits) held in the field PRD are defined as shown in FIG. 4. In FIG. 4, when the PRD is 11, 01, 00, and 10, the branch prediction is ST (strongly taken), LT (likely taken), LNT (likely not taken), and SNT (strongly not taken) respectively. Among these branch predictions, PRD(1)=1 for the ST and the LT, and PRD(1)=0 for the LNT and the SNT.

Figure 5:
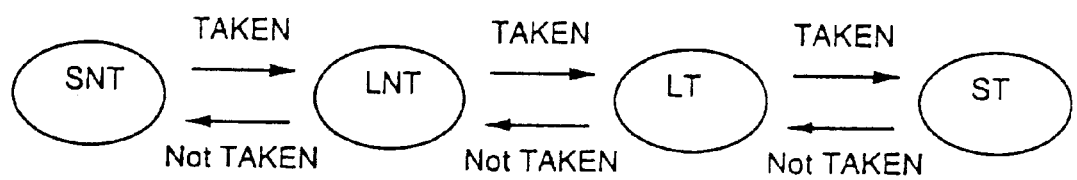
FIG. 5 shows the state transition of a prediction bit.

FIG. 5 shows the state transition of the prediction bits. In the states SNT, LNT, and LT, the state changes into the adjacent state on the right. When a corresponding branch does not occur in the states LNT, LT, and ST, the current state changes into the adjacent state on the left.

When a branch prediction is made by the BTB 23, the instruction buffer 13 holds not only an instruction, but also the signal TAKENED indicating that a branch prediction has been made through the BTB 23 and the branch prediction information PRD. In addition, the predicted branch target address TA is held in the buffer TA-BUF (not shown in the attached drawings). The buffer TA-BUF is used when it is determined whether or not a predicted address is correct.

When the signal TAKENED read from the instruction buffer 13 at an instruction decoding stage does not indicate that a branch prediction has been made using the BTB 23, control is performed using the above described HINT bit or performed without a branch prediction. On the other hand, when it indicates that a branch prediction has been made using the BTB 23, the validity of the branch prediction is checked.

Decoding an instruction can check that an instruction has become a non-branch instruction through rewriting the instruction. In addition, whether or not a branch target address is correct can be checked by comparing the sum (D__TA) of the value of the program counter, the offset value of the branch target address of the instruction, and a constant, with the address of the TA-BUF.

If it is detected in the above described check that an erroneous branch prediction is made, a branch target can be refetched by performing control using a HINT bit or without a branch prediction. In addition, the signal FAULT indicating that a branch prediction has failed and the branch prediction information PRD are transferred to the subsequent pipeline stage to determine the success/failure of a branch prediction and write data to the BTB.

When an instruction is decoded, it is not completely determined whether or not a branch occurs. The complete determination is made at the E stage as in the case in which a HINT bit is used. It is determined whether or not a branch prediction is correct by comparing the information of the signals TAKENED, FAULT, and HINT transferred as pipeline tags up to the E stage with the signal TAKEN generated by the branch decision circuit 50' at the E stage.

FIG. 6 shows the determination logic and the refetch address when an erroneous branch prediction is made. In FIG. 6, the symbol '-' indicates 'Don't care', and the signal MISS indicates the determination result of the branch prediction. However, it is not possible that a branch prediction fails (FAULT=1) using the BTB 23 during the decoding process when no branch predictions are made (TAKENED=0) using the BTB 23. When an erroneous branch prediction is made (MISS=1), an instruction is refetched at the address E__TA or E__PC+4 to recover the pipeline operations.

The operation specific to the present invention is described below. According to the present embodiment, among branch instructions which make a branch decision by referring to the condition code CC, a branch instruction which aims at awaiting an event is defined using a new instruction code different from a normal branch instruction. When the decoder 110 decodes the new instruction code, a signal D__NO__PRD indicating that a branch instruction awaiting an event has been detected is generated. The signal D__NO__PRD is used as a control signal indicating that no branch predictions are made.

Another method for realizing the signal D__NO__PRD is to assign a condition for awaiting an event to a specified bit of the CC. In this method, the signal D__NO__PRD is asserted when the specified bit is selected by a signal D__CND for selecting a bit of the branch condition code CC for a branch decision.

When a normal branch instruction is decoded in the above described instruction execution pipeline, the signal D__NO__PRD is negated, and the conventional branch prediction functions. On the other hand, when a branch instruction awaiting an event is decoded, the signal D__NO__PRD is asserted (D__NO$_{\_PRD=}$1).

At this time, since the AND circuit 111 receives the signal D__NO__PRD as inverted, the output from the AND circuit 111 is '0' independent of the value of the signal D HINT. Therefore, the signal D__HINT is forcibly negated by the signal D__NO__PRD, and a branch target fetch is not invoked during the decoding process.

Similarly, the signal E__NO__PRD transferred by a pipeline tag to the E stage negates the signal E__BRC input to the AND circuit 112. Therefore, the signal WE for control of a write to the BTB 23 is negated. Therefore, if an actual branching operation is performed, the information about the branch target address, etc. is not written to the BTB 23.

As a result, a branch instruction awaiting an event does not hit the BTB 23 when an instruction is fetched, but a branch target fetch based on the branch prediction during the fetching operation is suppressed. Thus, when a branch instruction awaiting an event is decoded, an instruction subsequent to the branch instruction is constantly fetched, thereby shortening the time taken for an exit from a loop when an event to be awaited occurs.

By the way, in the circuits shown in FIGS. 1C and 2B, only a branch instruction is entered in the BTB 23, but an offset for specifying the address of an instruction subsequent to any instruction, not limited to a branch instruction, can be entered in the BTB 23.

Figure 7:
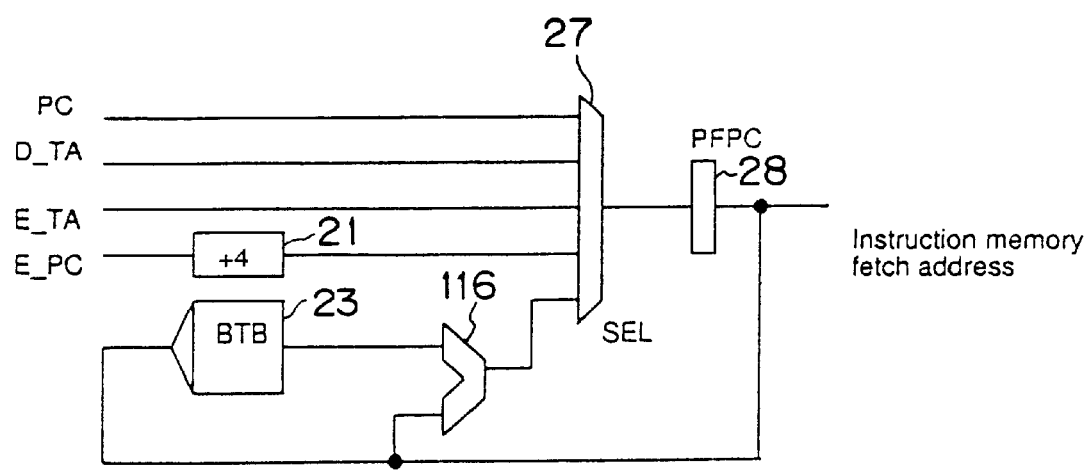
FIG. 7 shows the configuration of another instruction fetch control unit.
Figure 8:
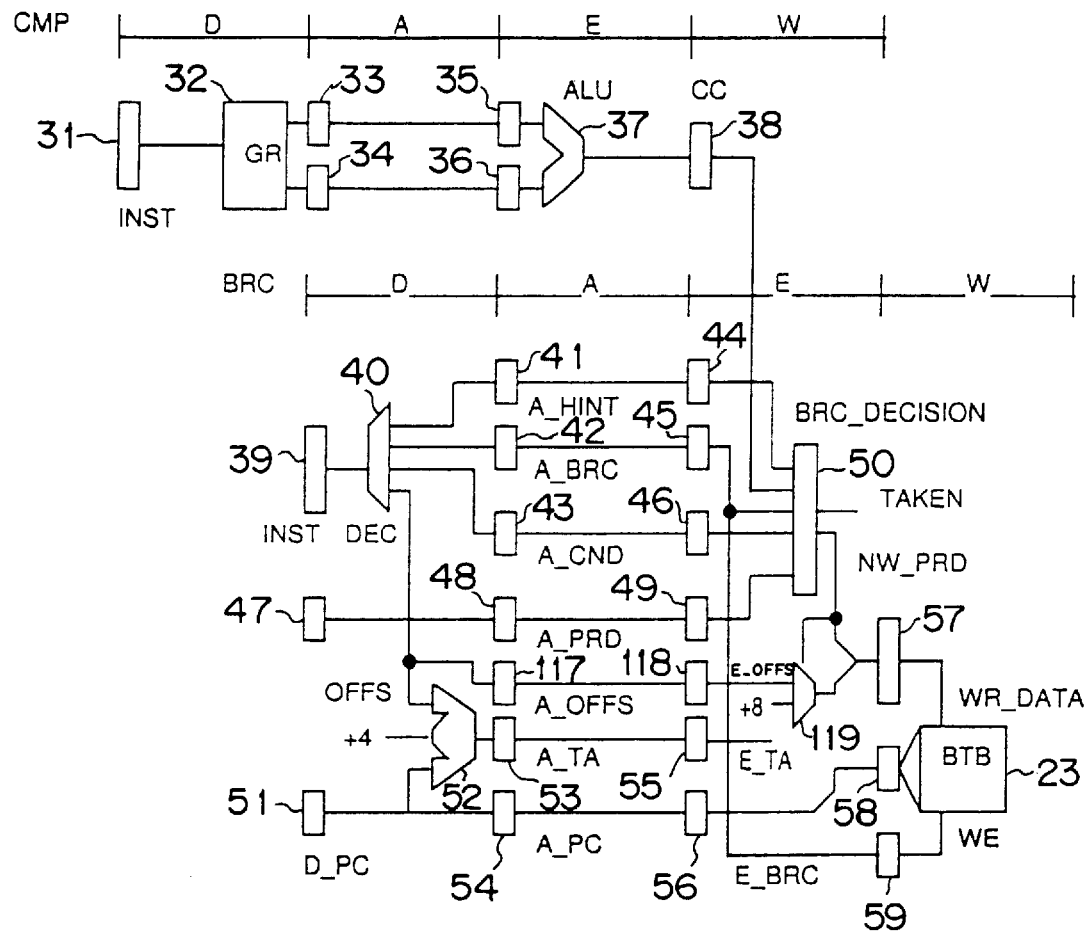
FIG. 8 shows another instruction execution pipeline.

In this case, the configuration of the instruction fetch control unit is shown in FIG. 7, and the configuration of the instruction execution pipeline is shown in FIG. 8. In FIG. 7, the component similar to that shown in FIG. 1B is assigned the same numeral, and a new adder 116 is added. In FIG. 8, the component similar to that shown in FIG. 1C is assigned the same numeral, and new registers 117 and 118, and selection circuit 119 are added.

In the BTB 23 shown in FIG. 7, '+8' is entered as an initial offset value, and normally indicates the second instruction subsequent to the current instruction. Therefore, two instructions can be fetched at a time. When the BTB 23 is updated, not a branch target address, but a branch target offset is written to the BTB 23.

The value of the branch target offset is generated by the circuit shown in FIG. 8. The offset OFFS specifying the branch target is managed as a pipeline tag by the registers 117 and 118, and input to the selection circuit 119. When a branch prediction information NW_PRD indicates that a branch occurs, the selection circuit 119 selects a signal E_OFFS. When it indicates that no branches occur, '+8' indicating the offset to the second instruction subsequent to the current instruction is selected, and the selected signal is output as a branch target offset.

With the above described configuration, the write control signal to the BTB 23 is negated by adding the circuit as shown in FIG. 2B, and the branch prediction using the BTB 23 is suppressed.

Furthermore, FIG. 2B shows an example in which a write operation to the BTB 23 is performed after deciding a branch. However, a new entry to the BTB 23 can be made or the BTB 23 can be updated immediately after a branch instruction is detected by decoding an instruction or during the instruction fetch to make a branch prediction at an earlier timing.

In such a case, since an instruction is decoded when a new entry is made, a branch instruction for which it is considered to be more effective that a branch prediction is not made, such as a branch instruction awaiting an event, can be detected. Therefore, the branch prediction using the BTB 23 can be suppressed by suppressing a new entry in the BTB 23.

In addition to the branch prediction suppression circuit, the register 115 holding the exclusive condition code (flag bit) CC2 for awaiting an event is added to the E stage in FIG. 2B. By adding the register 115, a signal EVENT indicating the state, etc. of one or more external I/O can be directly held without using an I/O instruction, etc. Thus, an instruction for performing the conventional I/O reading operation and a comparing operation is not required, thereby shortening the time taken for the execution. Therefore, a condition wait determination can be performed quickly, thereby improving a wait release performance.

When a branch decision is made using the CC2, a new conditional branch instruction code is defined for reference to the CC2 as a condition. When the decoder 110 decodes the instruction code, it generates a signal D_BRC(1) indicating that a conditional branch instruction for reference to the CC2 has been detected. The signal D_BRC(1) is used as a control signal for selecting the CC2 instead of the CC as a condition.

In addition, the decoder 110 also comprises a circuit for making a branch decision using the conventional CC as the decoder 40 shown in FIG. 1C. In this connection, a signal D_BRC(0) indicating that a conditional branch instruction for reference to the CC has been detected is also generated. This signal D_BRC(0) is also used as a control signal for selecting the CC as a condition. These two control signals are processed as a 2-bit signal D_BRC(0:1), managed as a pipeline tag, and propagated to the subsequent stages.

Since a conditional branch instruction for reference to the CC2 has been added, a logical sum of two signals E_BRC(0) and E_BRC(1) is generated in the circuit shown in FIG. 2B by an OR circuit not shown in the attached drawings. The output from the OR circuit is used as a signal corresponding to the signal E_BRC, etc. used as a signal indicating a branch instruction in the circuit shown in FIG. 1C for reference to the CC only.

FIG. 9 shows an example of the configuration of the branch decision circuit 50' shown in FIG. 2B. The branch decision circuit 50' has the function of referring to the CC2 in addition to the function of the branch decision circuit 50 shown in FIG. 1C. The circuit shown in FIG. 9 comprises selection circuits 121 and 122, an inverter 123, and gate circuits (AND circuits, OR circuits, and an EXOR circuit) 124 through 137, and generates signals TAKEN, MISS, and NW_PRD(0:1). Among the signals, the signal MISS is generated based on the determination logic shown in FIG. 6, and is asserted when an erroneous branch prediction is made.

The signal TAKEN is generated by selecting a flag bit of the condition code CC or CC2 using the signal E_CND and the signal E_BRC(0:1) as control signals. The selection circuits 121 and 122 are controlled by the signal E CND of a plurality of bits, and select the flag bit of the CC2 and the CC respectively.

The 2-bit signal E_BRC(0:1) can have a value of 00, 10, or 01. The bit 0 is input to the AND circuit 125. The bit 1 is input to the AND circuit 124. The OR circuit 126 outputs a logical sum of the output from the AND circuit 124 and the output from the AND circuit 125 as a signal TAKEN.

Therefore, when the signal E_BRC(0:1) is 10, the flag bit of the CC is output as a signal TAKEN. When the signal E_BRC(0:1) is 01, the flag bit of the CC2 is output as a signal TAKEN. The former signal 10 is generated by the decoder 110 when a normal conditional branch instruction for reference to the CC is detected. The latter signal 01 is generated when a new conditional branch instruction for reference to the CC2 is detected.

Figure 1D:
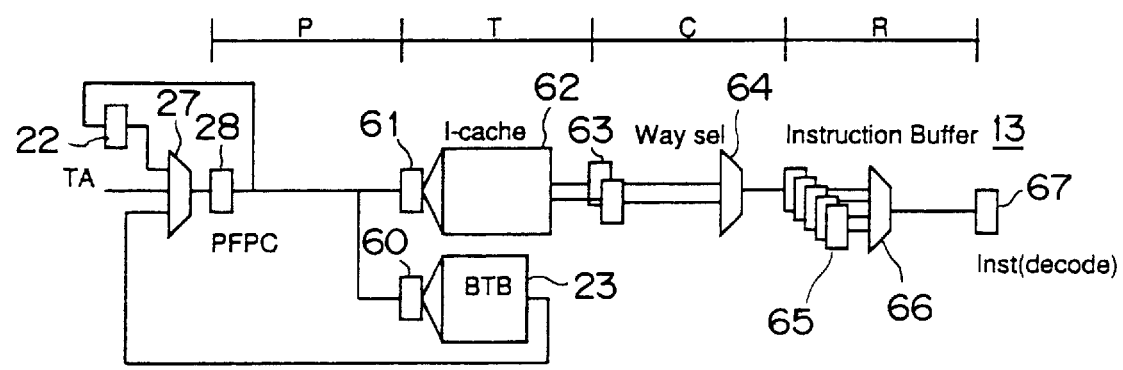
FIG. 1D shows an instruction memory access pipeline.
Figure 1E:
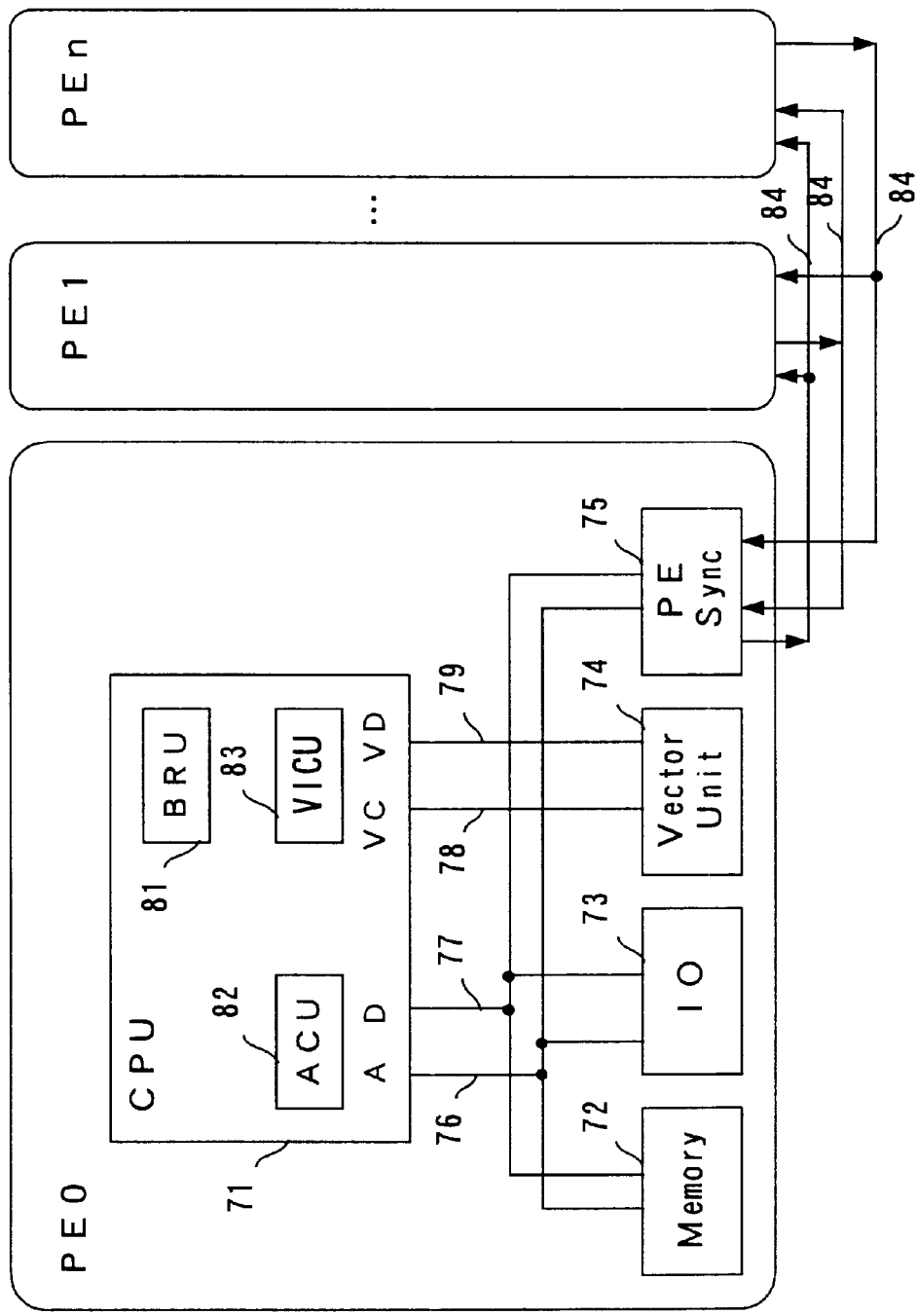
FIG. 1E shows an example of awaiting an event.
Figure 10:
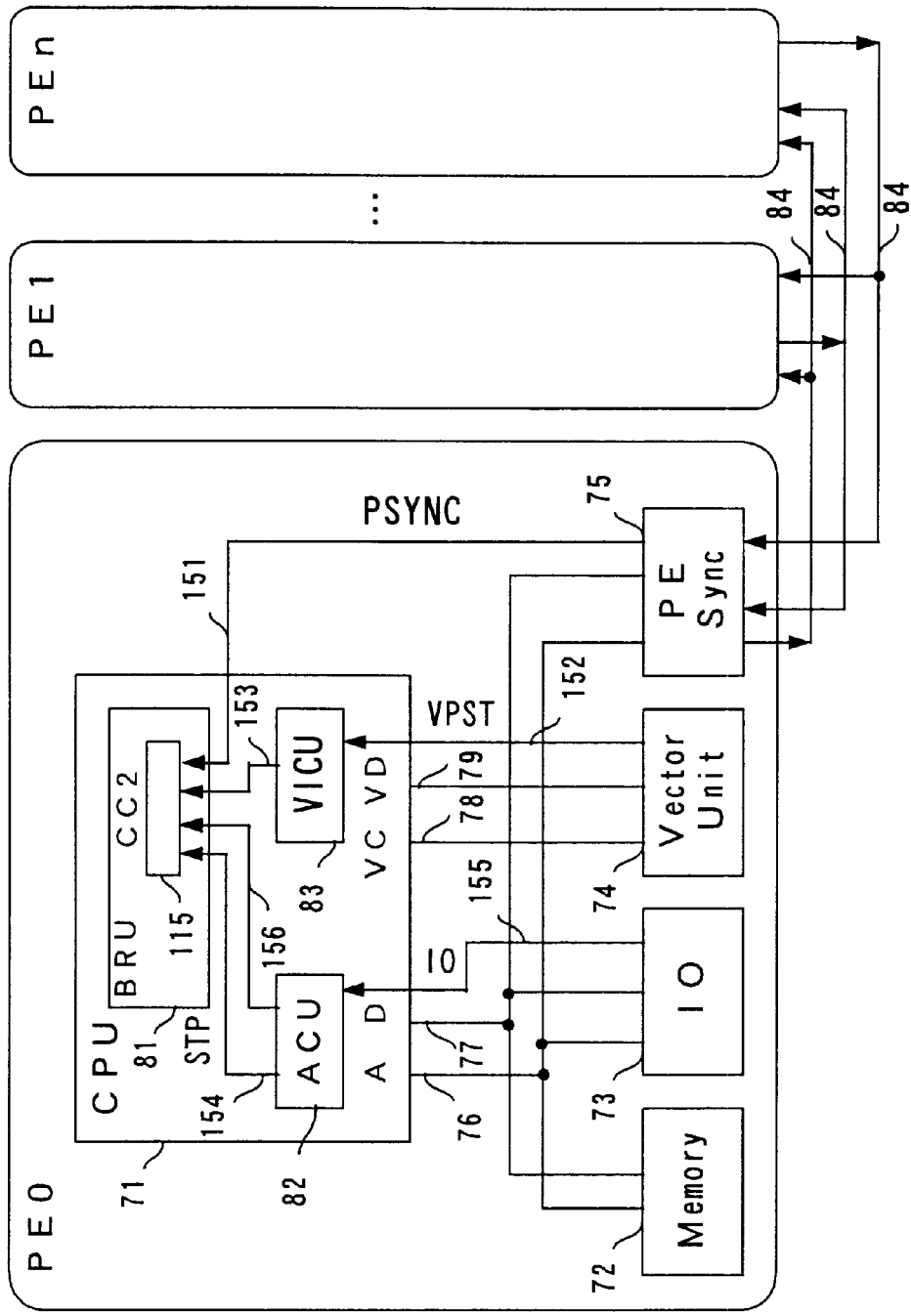
FIG. 10 shows a write of a condition code.

FIG. 10 shows an example of writing the condition code CC2 in the parallel computer shown in FIG. 1E. In FIG. 10, the register 115 holding the CC2 is provided in the BRU 81, and is directly connected to the synchronization circuit 75, the ACU 82, and the VICU 83. For example, the BRU 81 corresponds to the circuit containing the BTB 23 and the branch decision circuit 50' shown in FIG. 2B.

The CC2 has four flags CC2.PSYNC, CC2.VSTP, CC2.STP, and CC2.IOP. The value of each flag is updated by a signal from the source of a corresponding event.

The CC2.PSYNC indicates the synchronization wait state between PEs. The CC2.VSTP indicates the main storage write state by the vector unit 74. The CC2.STP indicates the main storage write state by the SU 71. The CC2.IOP indicates the operation completion wait state by the IO 73.

The synchronization circuit 75 monitors the signal of the signal line 84, and determines that the synchronization wait between PEs can be released when a predetermined condition is satisfied. Then, the flag CC2.PSYNC is negated through the signal PSYNC of a signal line 151 directly connected to the register 115.

The predetermined condition depends on the program operating in the PEs. For example, a program can be prepared such that each PE computes a part of data, the data in all PEs are collected when the computation converges, the data is distributed again to each PE and then the computation starts with the next step. In this case, PEs are to be synchronized to report the convergence of the partial data processed by each PE. The AND condition of the completion of the partial operations of all PEs performing an assigned job is defined as the condition of the release of the entire synchronization wait.

In addition, when only one piece of data satisfying the retrieval condition is to be retrieved in the database search, the computer makes each PE search a part of a large database, and the entire database is searched in parallel. When a PE detects a matching piece of data, it reports the completion of the partial operation to the other PEs. In this case, the OR condition of the completion of the partial operations of all PEs is the condition of the release of the entire synchronization wait.

Furthermore, when the CPU (SU) 71 receives the computation result of the vector unit (VU) 74, the computation result is written to the memory 72. The SU 71 waits for the completion of the write to start executing a memory read instruction. The signal VSTP (vector store pending) indicating the VU 74 writing to memory is connected from the VU 74 to the VICU 83, and is then to the register 115 through a signal line 153.

The VICU 83 is used to reflect information of the vector command being transmitted to the VU 74 in the signal VSTP. For example, when the vector command being transmitted instructs a write operation by the VU 74 to the memory 72, the VICU 83 can amend the signal VSTP such that the CC2.VSTP indicates a writing state to the memory 72 although the signal VSTP indicates a non-writing state.

On the other hand, when the VU 74 receives the computation result of the SU 71 through the memory 72, the computation result is written to the memory 72. The VU 74 has to wait for the completion of the write, and then start executing a memory read instruction. Then, the signal STP (store pending) indicating the memory 72 being written by the SU 71 is connected from the ACU 82 to the register 115 through a signal line 154.

In this case, no signal lines exist from the memory 72 to the ACU 82 because a writing operation is to be completed within a predetermined time when a write to the memory 72 is transmitted from the ACU 82 to the memory 72. Therefore, if the predetermined time has passed, the signal STP is automatically negated.

The signal IOP (IO pending) indicating the operation being performed by the IO 73 is connected from the IO 73 to the ACU 82 through a signal line 155, and is then connected to the register 115 through a signal line 156.

Thus, the register 115 for holding the condition code CC2 for awaiting an event is provided in the CPU 71, and is connected to the source of the event to be awaited through an exclusive signal line, thereby directly transmitting the occurrence of the event to be awaited to the CPU 71. As a result, it is possible to quickly exit from a loop process awaiting for an event when the event to be awaited occurs.

New instruction codes introduced in the present embodiment can be classified into at least two groups as follows.

(1) a conditional branch instruction awaiting an event and referring to the CC as a condition
(2) a conditional branch instruction awaiting an event and referring to the CC2 as a condition These instruction codes are furthermore classified depending on the type of an event to be awaited, the flag bit to be referred to, etc.

In the above described embodiment, a pipeline of a branch instruction is described as a pipeline comprising stages similar to those of other instructions. However, the present invention can also be applied to the case in which a pipeline exclusive for a branch instruction is installed.

How the time taken to exit from a loop can be shortened according to the present invention is described below by referring to FIGS. 11 through 15.

FIG. 11 shows a process sequence in the following loop process in which a branch prediction is made using a branch target table.

label: brc busy, label

In FIG. 11, the P stage, the T stage, the C stage, and the R stage correspond to the instruction memory access pipeline shown in FIG. 1D. The D stage, the A stage, the E stage, and the W stage correspond to the instruction execution pipeline. Among the stages, the 'BTB' of the T stage indicates that a branch prediction has been made using the BTB. The 'TKN' of the E stage indicates that a branch has been executed. The 'N-TKN' indicates that a branch has not been executed.

First, a branch is executed at the E stage of the first (1st) loop execution instruction, and the BTB is updated at the W stage. The update result is not immediately reflected, but can be reflected in the prediction made using the BTB after repeating a loop many times. Otherwise, as a result of the previous execution of the instruction, it is reflected in the prediction made using the BTB.

As a result, the search of the BTB hits at the T stage of the i-th loop execution instruction, and a branch is executed at the E stage. Thus, while a loop is repeated, the waiting time (penalty) taken for the branch prediction is 1 clock (1τ) as indicated by '='.

If a branch is not executed at the E stage of the j-th loop execution instruction after an event to be awaited occurs, then an instruction fetch on the non-branch side is started. In this case, the waiting time taken for the exit from the loop is 6 clocks (6τ) as indicated by the symbol '#'.

On the other hand, the process sequence followed when a branch prediction is not made using the branch target table is shown in FIG. 12. In this case, a subsequent instruction on the non-branch side is preliminarily fetched.

If a branch is executed at the E stage of the first loop execution instruction, then the loop execution instruction of the preliminarily fetched subsequent instruction is canceled, and a branch target instruction is fetched again. Therefore, the waiting time in the loop is 6τ as indicated by the symbol '#'.

If a branch is not executed at the E stage of the j-th loop execution instruction after an event to be awaited occurs, a preliminarily fetched subsequent instruction is executed as is. Therefore, the waiting time taken for the exit from the loop is 0τ.

Thus, in this example, the time taken to exit from the loop can be shortened by 6τ by performing control such that a branch prediction can be suppressed. Furthermore, with an average error of the above described sampling time taken into account, (6+0.5)−(0+3)=3.5 (τ) can be shortened on an average.

Then, using the condition code CC2 exclusive for awaiting an event, the time taken for an exit from a loop can be furthermore shortened as follows.

Figure 13:
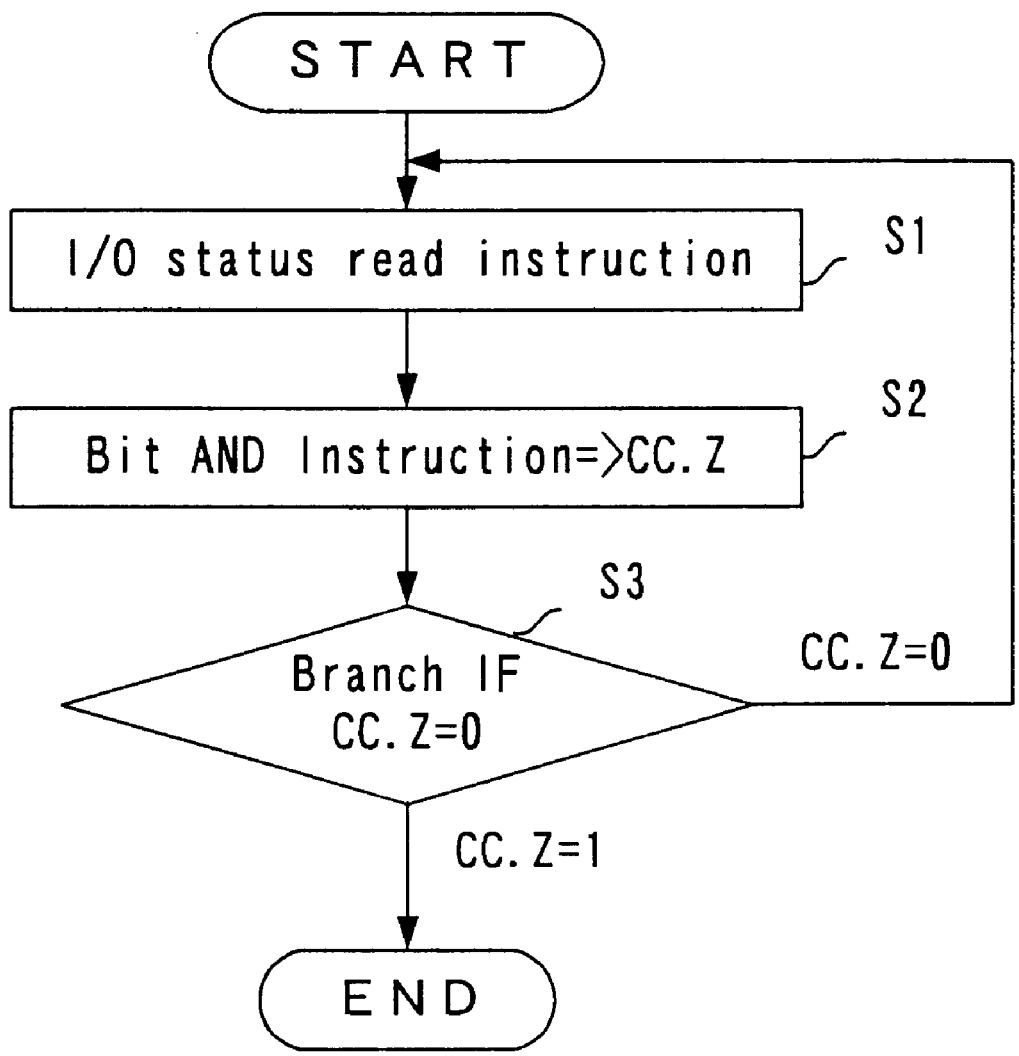
FIG. 13 is a flowchart of the first loop process.

FIG. 13 is a flowchart of a loop process in which the completion of the I/O operation is awaited using a normal condition code CC. The CPU first executes an IO status read instruction (external reference) (step S1), executes a Bit AND instruction (logic operation), and updates the zero flag CC.Z of the CC (step S2). Then, the value of the flag CC.Z is checked (step S3), and the branch is executed to the process in step S1 if CC.Z=0. If the IO operation is completed and CC.Z=1, control exits from the loop, and is passed to the process of the subsequent instruction.

In this case, the execution time taken in steps S1, S2, and S3 is 10 through 100 clocks, 1 clock, and 2 through 7 clocks respectively. A total execution time is 13 through 108 clocks. Most of the time is taken as the IO status read instruction execution time.

Figure 14:
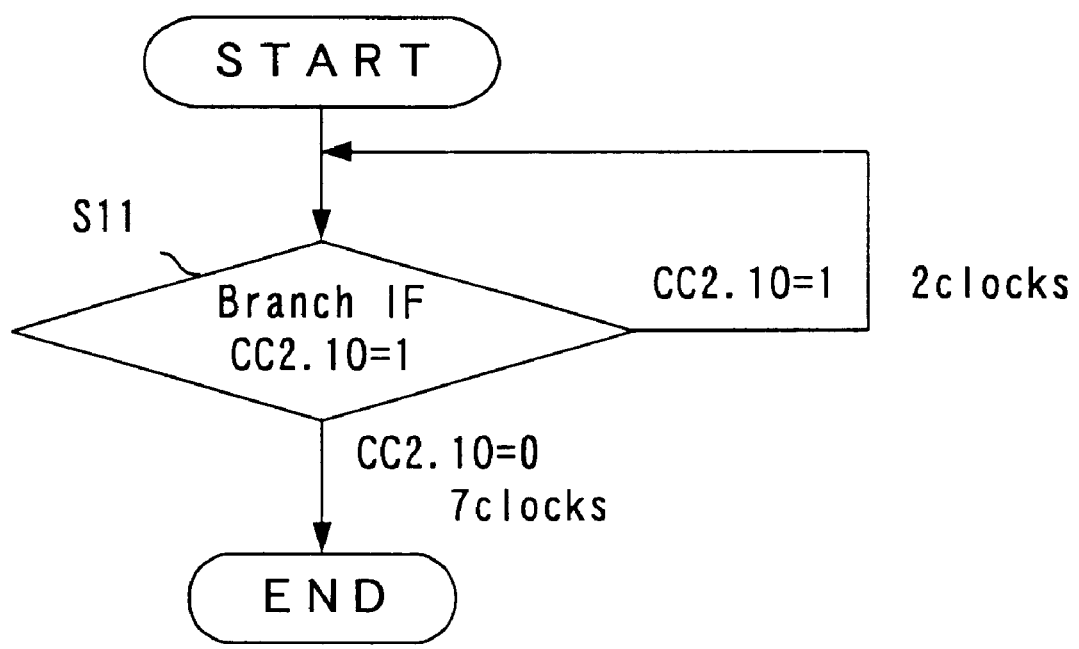
FIG. 14 is a flowchart of the second loop process.

On the other hand, FIG. 14 is a flowchart of awaiting the completion of the IO operation by using the exclusive condition code CC2 and making a branch prediction using the branch target table. The CPU checks the value of the IO flag CC2.IOP of the CC2 (step S11), and repeats the process in step S11 if CC2.IOP=1. When the IO operation is completed, and CC2.IOP=0, control exits from the loop, and is passed to the process of the subsequent instruction.

In this case, as shown in FIG. 11, the execution time taken when a loop is repeated is 2 (=1+1) clocks. The execution time taken when control exits from the loop is 7 (=1+6) clocks. Therefore, as compared with the case shown in FIG. 13, the loop process can be performed in a much shorter time.

In addition, since the flag can be sampled once in 2 clocks in this example, the sampling error is (0+1)/2=0.5 ($\tau$) on an average. Therefore, the waiting time taken to exit from a loop is 0.5+6=6.5 ($\tau$).

FIG. 15 is a flowchart of the process in which the completion of the IO operation is awaited by using the exclusive condition code CC2 and without making a branch prediction using the branch target table. The CPU checks the value of the flag CC2.IOP (step S21), and repeats the process in step S21 if CC2.IOP=1. When the IO operation is completed, and CC2.IOP=0, control exits from the loop, and is passed to the process of the subsequent instruction.

In this case, as shown in FIG. 12, the execution time taken when a loop is repeated is 7 (1+6) clocks. The execution time taken when control exits from the loop is 1 (=1+0) clock. Therefore, as compared with the case shown in FIG. 13, the loop process can be performed in a much shorter time.

In addition, since a flag can be sampled once in 7 clocks in this example, the sampling error is (0+1+3+4+5+6)/7=3 ($\tau$) on an average. Therefore, the waiting time taken to exit from a loop is 3+0=3($\tau$) on an average. Thus, the time is shorter than the case shown in FIG. 14.

Furthermore, the resources of the branch target table can be prevented from being wasted by suppressing a branch prediction, thereby obtaining the effect similar to that of increasing the number of entries in the branch target table, and improving the performance of the computer.

According to the present invention, a prediction of the behavior of a branch loop awaiting an event can be improved in the information processing apparatus for performing a pipeline process including a branch prediction, thereby shortening the waiting time taken to exit from a loop.

What is claimed is:

1. An information processing apparatus performing a pipeline process in which a branch prediction is made, comprising:

a detection circuit to decode an instruction and detect that the instruction is a branch instruction in a loop process for awaiting an event enabling the information processing apparatus to exit the loop process; and a suppression circuit to suppress, when said detection circuit detects the branch instruction in the loop process, a branch prediction made when the branch instruction is fetched by suppressing update of a branch prediction table based on a result of a branch operation when the branch operation is performed by the branch instruction for awaiting the event.

2. The apparatus according to claim 1, wherein said suppression circuit suppresses a branch prediction made when the branch instruction for awaiting the event is decoded by negating a signal generated from a decoding result of the branch instruction and causes a branch target address obtained from the decoding result to be used as a prefetch address.

3. The apparatus according to claim 1, further comprising a storage circuit storing exclusive condition code information for awaiting the event, wherein said detection circuit detects that the branch instruction for awaiting the event is a conditional branch instruction referring to the exclusive condition code information, and outputs a control signal for reference to the exclusive condition code information.

4. The apparatus according to claim 3, wherein said exclusive condition code information stored in said circuit is updated by a signal from a source of the event to be awaited.

5. The apparatus according to claim 3, wherein said detection circuit detects that the branch instruction for awaiting the event is a predetermined conditional branch instruction which makes a branch decision according to the exclusive condition code information as a condition.

6. A method of processing information for performing a pipeline process in which a branch prediction is made, comprising:

decoding an instruction;

determining whether the instruction is a branch instruction in a loop process for awaiting an event enabling an exit from the loop process;

making the branch prediction for the instruction when the instruction is at least one branch instruction other than the branch instruction in the loop process; and suppressing, when the instruction is the branch instruction in the loop process, a branch prediction made when the branch instruction is fetched by suppressing update of a branch prediction table based on a result of a branch operation when the branch operation is performed by the branch instruction for awaiting the event.

7. The method according to claim 6, wherein:

when the instruction is the branch instruction for awaiting the event, it is determined whether or not the branch instruction for awaiting the event is a conditional branch instruction referring to exclusive condition code information for awaiting the event; and when the branch instruction for awaiting the event is the conditional branch instruction, a branch decision is made by referring to the exclusive condition code information.

8. An information processing apparatus performing a pipeline process in which a branch prediction is made, comprising:

detection means for decoding an instruction and detecting that the instruction is a branch instruction in a loop process for awaiting an event enabling the information processing apparatus to exit the loop process; and suppression means for suppressing, when said detection means detects the branch instruction in the loop process, a branch prediction made when the branch instruction is fetched by suppressing update of a branch prediction table based on a result of a branch operation when the branch operation is performed by the branch instruction for awaiting the event.

9. An information processing apparatus having an input/output device and performing a pipeline process in which a branch prediction is made, comprising:

a detection circuit to decode an instruction and detect that the instruction is a branch instruction in a loop process for awaiting completion of an operation of the input/output device; and a suppression circuit to suppress, when said detection circuit detects the branch instruction in the loop process, a branch prediction made when the branch instruction is fetched by suppressing update of a branch prediction table based on a result of a branch operation when the branch operation is performed by the branch instruction for awaiting the event.

10. An information processing apparatus having a plurality of processor elements and performing a pipeline process in which a branch prediction is made, comprising:

a detection circuit to decode an instruction and detect that the instruction is a branch instruction in a loop process for awaiting completion of barrier synchronization among the processor elements; and a suppression circuit to suppress, when said detecting circuit detects the branch instruction in the loop process, a branch prediction made when the branch instruction is fetched by suppressing update of a branch prediction table based on a result of a branch operation when the branch operation is performed by the branch instruction for awaiting the event.

11. An information processing apparatus having main storage and performing a pipeline process in which a branch prediction is made, comprising:

a detection circuit to decode an instruction and detect that the instruction is a branch instruction in a loop process for awaiting completion of an access operation to the main storage; and a suppression circuit to suppress, when said detection circuit detects the branch instruction in the loop process, a branch prediction made when the branch instruction is fetched by suppressing update of a branch prediction table based on a result of a branch operation when the branch operation is performed by the branch instruction for awaiting the event.

* * * * *